(12) United States Patent
Moodie et al.

(10) Patent No.: US 6,688,982 B2
(45) Date of Patent: Feb. 10, 2004

(54) WIRELESS COMMUNICATIONS SYSTEM FOR A QUIZ GAME

(75) Inventors: Justin Charles Moodie, London (GB); Matthew Peter Travers, London (GB); Michael Jonathan Terry, Saffron Walden (GB)

(73) Assignee: Agency.Com Ltd., London (GB)

( * ) Notice: Subject to any disclaimer, the term of this patent is extended or adjusted under 35 U.S.C. 154(b) by 419 days.

(21) Appl. No.: 09/725,053

(22) Filed: Nov. 29, 2000

(65) Prior Publication Data
US 2002/0104007 A1 Aug. 1, 2002

(51) Int. Cl.[7] .............................................. A63F 13/00
(52) U.S. Cl. ............................ 463/41; 463/9; 273/430; 273/460; 434/351
(58) Field of Search ............................ 463/41, 40, 25, 463/9, 1; 273/460, 430; 434/322, 332, 350, 351

(56) References Cited

U.S. PATENT DOCUMENTS

| | | | | |
|---|---|---|---|---|
| 5,743,745 A | * | 4/1998 | Reintjes | 434/307 |
| 5,759,101 A | * | 6/1998 | Von Kohorn | 463/40 |
| 5,973,475 A | * | 10/1999 | Combaluzier | 320/107 |
| 6,015,344 A | * | 1/2000 | Kelly et al. | 463/16 |

* cited by examiner

Primary Examiner—Jessica Harrison
(74) Attorney, Agent, or Firm—Kenyon & Kenyon

(57) ABSTRACT

In a quiz game, a first question and a telephone number are displayed at a location. A user enters an answer to the question on an SMS-enabled handset and sends it to the designated telephone number. If the answer is correct, the user receives a further question via SMS, and replies with a further answer. Further questions may be received and answers sent. If all of the answers are correct, the user is prompted to send a message with a name and optionally a choice of prize. The user then receives a voucher number. The voucher number and the name entered by the user, and optionally an identification of the choice of prize, are transmitted to another terminal, which may be another SMS-enabled handset belonging for example to a bartender. The bartender calls out the name and the user presents the voucher number to the bartender. If the presented voucher number matches that received by the bartender, the user receives the prize, such as their choice of free drink.

28 Claims, 2 Drawing Sheets

WIRELESS COMMUNICATIONS SYSTEM FOR A QUIZ GAME

FIELD OF THE INVENTION

The present invention relates to a wireless communication system, method and apparatus for implementing a transaction, particularly but not exclusively for implementing a game in which a prize is given for answering one or more questions correctly.

BACKGROUND OF THE INVENTION

The GSM wireless cellular standard includes a short message service (SMS) function, allowing text messages to be sent to and from mobile terminals. The SMS function has been used to implement a quiz game in which answers to questions are sent via SMS to a designated number. For example, in a marketing campaign run by the Pepsi-Cola Company in Sweden, a question and a telephone number were printed on bottle tops. Customers were encouraged to send their answer to the question as an SMS message from their mobile telephone. If the answer were correct, a second question would be sent to that mobile telephone via SMS. At the end of the competition, various prizes were awarded to customers who answered all questions correctly.

A disadvantage of this system is that prizes could not be awarded immediately, which detracted from the excitement of playing the game. A further disadvantage is that an additional administration system was needed to award the prizes.

SUMMARY OF THE INVENTION

According to the present invention, there is provided a wireless messaging system in which messages can be sent to and from any selected one of a number of wireless terminals, in which a user is prompted to send a message from one of the wireless terminals to a designated network address. If the message matches a predetermined message, a further message is sent to a further terminal other than the user's mobile terminal, including an identifying code. The identifying code may be verified with the user to allow a prize to be issued.

In one embodiment, the user is notified of a first question and the designated address, such as a telephone number, by material displayed at a location. The user enters an answer to the question on an SMS-enabled handset and sends it to the designated telephone number. If the answer is correct, the user receives a further question via SMS, and replies with a further answer. Further questions may be received and answers sent. If at any time an incorrect answer is received, a final message is sent to the user and the game ends. However, if all of the answers are correct, the user is prompted to enter their name and optionally a choice of prize, such as a choice of free drink. The user then receives a voucher number. The voucher number and the name entered by the user, and optionally an identification of the choice of prize, are transmitted to the further terminal, which may be another SMS-enabled handset belonging for example to a staff member such as a bartender. The bartender calls out the name and the user presents the voucher number to the bartender. If the presented voucher number matches that received by the bartender, the user receives the prize, such as their choice of free drink.

BRIEF DESCRIPTION OF THE DRAWINGS

Specific embodiments of the present invention will now be described with reference to the accompanying drawings, in which.

DETAILED DESCRIPTION OF PREFERRED EMBODIMENTS

Figure 1:
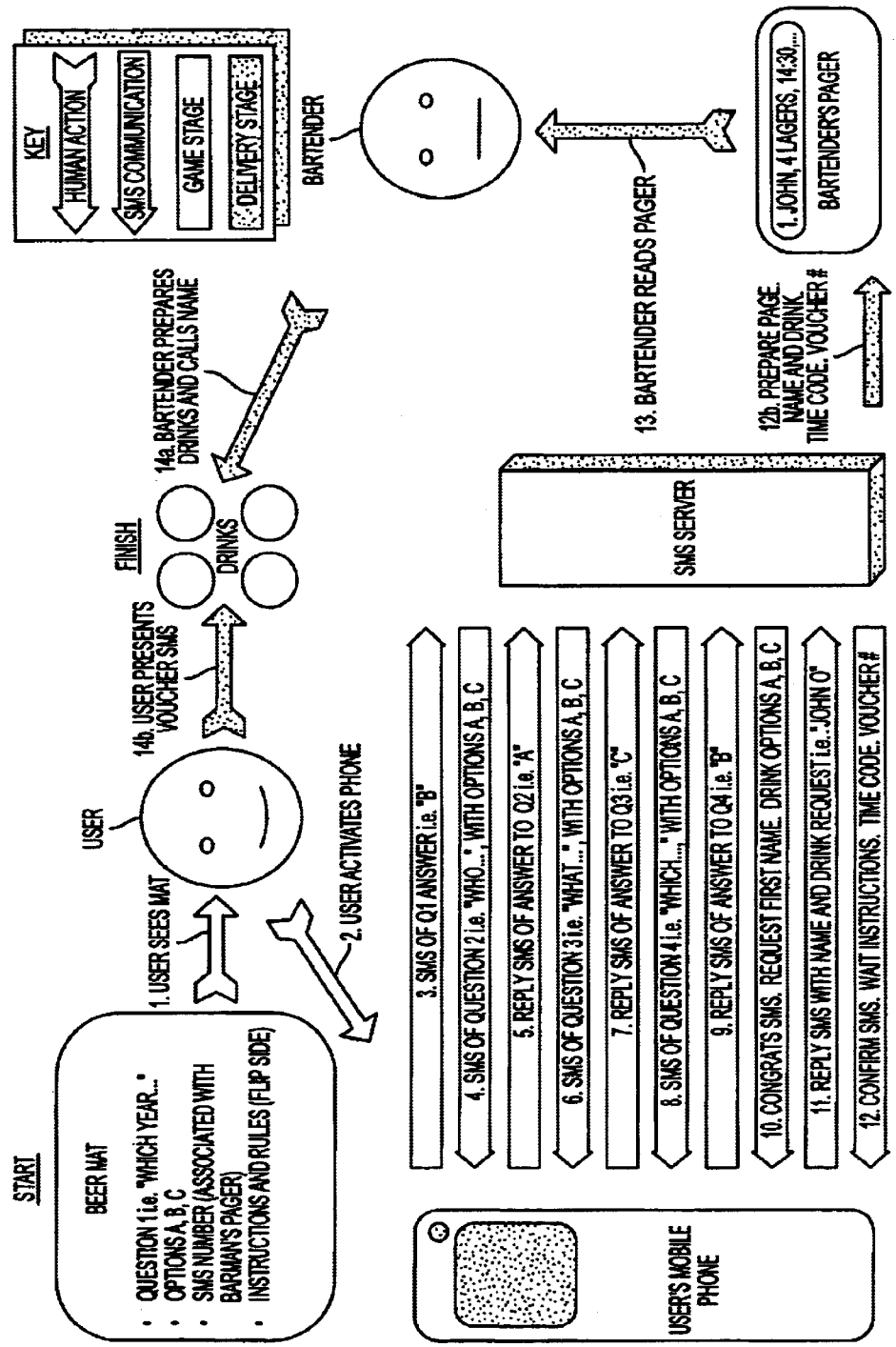
FIG. 1 is a schematic diagram showing the operation of a system in an embodiment of the invention.

A specific preferred embodiment for implementing an SMS-based trivia quiz game at a bar will now be described with reference to FIGS. 1 and 2. However, as explained below, the details of the system are in no way limiting of the scope of the invention.

In this specific scenario, the User visits a bar and sees (step 1) a Beer Mat, on one side of which is printed a multiple-choice question and a telephone number, and on the other side of which is printed a set of instructions and rules. The User activates the User's Mobile Phone (step 2), enters the reference letter of one of the given answers to the question on the Beer Mat, keys in the telephone number printed on the Beer Mat and sends (step 3) the answer to the SMS Server. The SMS Server compares the reference letter with a stored reference letter relating to the correct answer to that question; if they are the same, the SMS Server sends to the User's Mobile Phone (step 4) a text message containing a second multiple-choice question. The User enters a reference letter relating to one of the possible answers and sends (step 5) this to the SMS Server as a reply message. The SMS Server compares the reference letter with a stored reference letter relating to the correct answer to the second question; if they are the same, the SMS Server sends to the User's Mobile Phone (step 6) a text message containing a third multiple-choice question. The User enters a reference letter relating to one of the possible answers and sends (step 7) this to the SMS Server as a reply message. The SMS Server compares the reference letter with a stored reference letter relating to the correct answer to the third question; if they are the same, the SMS Server sends to the User's Mobile Phone (step 8) a text message containing a fourth multiple-choice question. The User enters a reference letter relating to one of the possible answers and sends (step 9) this to the SMS Server as a reply message. The SMS Server compares the reference letter with a stored reference letter relating to the correct answer to the fourth question; if they are the same, the SMS Server sends to the User's Mobile Phone (step 10) a text message congratulating the User on winning, requesting a name, and offering a choice of prizes each referenced with a letter, such as a choice of free drinks. In reply, the User sends (step 11) a text message containing a name followed by a letter indicating a choice of prize, for example 'John C'. The SMS Server, in response to receipt of this text message, sends (step 12a) a confirmation message to the User's Mobile Phone including a time code and a voucher number, and sends (step 12b) a message to the Bartender's Pager including the same voucher number, the time code, the name input by the User at step 11, and details of the prize selected, such as a type and quantity of free drinks. The bartender receives and reads the message (step 13), prepares the free drinks and calls the name indicated by the message (step 14a). The User presents (step 14b) the voucher number received at step 12a, the bartender verifies this voucher number against that received by the Bartender's Pager and gives the User the prize if the voucher number is verified. The time code indicates a time by which the prize must be claimed. If the User does not perform step 14b before that time, the prize may not be awarded.

In this way, a prize may be won immediately on successful completion of a quiz, at the location where the User participated in the quiz and without the requirement of a separate administrative system to contact the user and deliver the prize.

An additional advantage of this system is that it can be offered as a promotional scheme to outlets at minimal cost, simply by supplying a pager and promotional printed material, and by registering the number of the pager with the SMS Server. As an alternative to the pager, the Bartender may use a mobile telephone which can receive text messages; this may already be available and need not be supplied.

Figure 2:
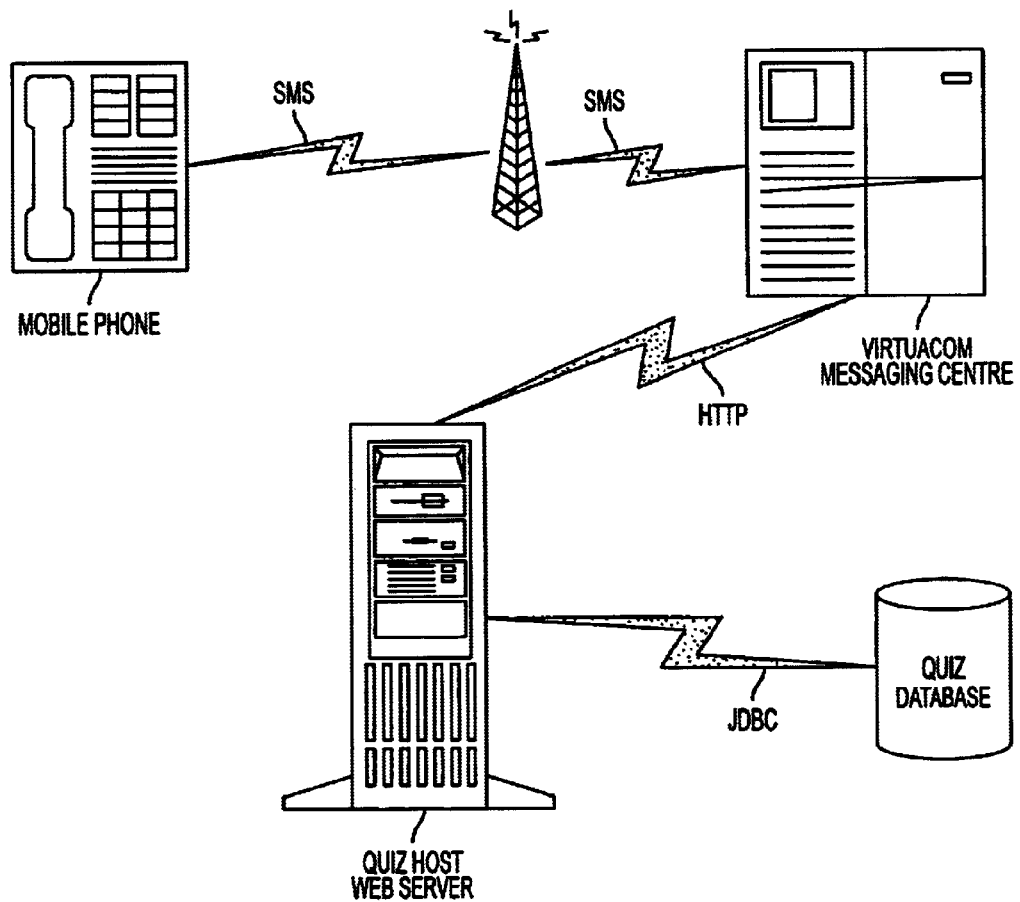
FIG. 2 is a diagram of the technical architecture used to implement that system.

A more detailed explanation of the technical aspects of the system will now be provided, with reference to FIG. 2.

The SMS Server comprises four main elements:
  i. a mobile phone/user interface which sends and receive answers and questions;
  ii. a messaging centre which routes messages between the user and the application;
  iii. a quiz host web server which manages the quiz; and
  iv. a database server which maintains the quiz session state and archives completed sessions.

The four elements communicate using current standard networking protocols:
  i. SMS—for mobile phone 'text messaging'
  ii. HTTP—for internet access.
  iii. JDBC—for Java database access The architecture is scalable in that the four elements may each be hosted on separate servers located at physically diverse sites.

The architecture is based on open standards as far as possible. The only customised parts of the system are in the messaging centre, comprising for example one short Perl script, and the database schema, which is easily translatable between any major relational database formats.

Virtuacom is used as the messaging broker at the messaging centre to translate the user's SMS messages into HTTP requests to the main quiz server. This is done using a Virtuacom information on demand (IOD) script named 'trivia'.

The trivia script performs the following actions:
  i. Get the user's phone number.
  ii. Get the user's answer (A, B, C or D).
  iii. To a quiz servlet on the quiz server, send an HTTP request consisting of the phone number and the given answer.
  iv. If the response to this request is another question, pass it on to the user's phone.
  v. Otherwise, if the user has won, send a winning message, including verification code, to the user's phone, and also send a winning message, including verification code, to the 'Bartender'.

The Quiz Java servlet is a wrapper to call the QuizSession class methods, as described below. The Quiz servlet is registered with the web server on the quiz server machine. When compiling the Quiz servlet, CLASSPATH needs to be able to locate the QuizSession class. The Java class named QuizSession controls the operation of user quiz sessions. This class is used by the Quiz servlet, and thus must be visible via CLASSPATH when compiling the Quiz servlet class.

The QuizSession class has the following public methods:
  QuizSession(String quiz)—constructor, requires the name of the quiz in order to instantiate a quiz session by retrieving the appropriate quiz metadata from the database.

String processSession(String telNo, String answer)—runs the next step of the current session identified by the phone number. If there is no current session for the phone number, a session is started and the first step is run.

Using the QuizSession class to run a quiz session is thus extremely simple. For each SMS answer submitted by the user, the following happens:
  i. The Virtuacom IOD script invokes the servlet URL with the quiz name and user's phone number and answer. For example:
    http://www.quiz.com/servlet/Quiz?quiz=trivia&pno=07967070707&answer=A
  ii. The Quiz servlet instantiates the QuizSession class using the quiz HTTP request parameter.
  iii. The Quiz servlet calls the QuizSession.processSession method with the pno (user's phone number) and answer HTTP request parameters.

The processSession method functions as follows. Any output from this class goes back to the Virtuacom trivia script as part of the HTTP response:
  i. Get the current session data.
  ii. If no current data exists, the current user is one of:
    a. Winner who has not yet accepted their prize.
    b. Starting a brand new quiz session.
  iii. If the current user is a winner:
    a. Generate a verification code
    b. Output the verification code.
    c. Update the archived session status to indicate prize has been accepted.
    d. Exit.
  iv. If this is a new session, check that the given answer matches the initial expected answer.
    a. If it matches, generate a new session record in the database with session level 1.
    b. If it does not match, generate an archived session record with status 'lost' and exit.
  v. If this is an existing session, check the given answer against the expected answer:
    a. If incorrect, terminate the session and archive it with status 'lost', output an appropriately conciliatory message and exit.
    b. If correct, and incremented session level is greater than max level, this is a winner. So archive the session with status 'winner—prize not yet accepted'.
    c. If correct, and incremented session level is less than or equal to the maximum level, get the next question and answer. Update the current session with the next expected answer and output the next question.

The Quiz Database comprises records relating to multiple quizzes i.e. sets of questions and associated answers. For each quiz, there are stored:
  i. quiz parameters
  ii. a set of questions
  iii. current session data
  iv. archived session data The quiz parameters include:
  i. Unique quiz identifier.
  ii. Number of levels, corresponding to the number of questions that must be answered correctly in order to win a prize.
  iii. Number of questions per level. This is used to enhance performance in random question selection. Every level has the same number of questions.

iv. Timeout period. If a question not answered within this period, the corresponding quiz session is abandoned.
v. First answer, given that the initial question is garnered from the user's environment rather than from the application.
vi. Auxiliary phone number. This is the 'Bartender' number that is alerted when a user wins a prize. There may be only one auxiliary number per quiz. However, multiple auxiliary numbers are stored if multiple locations per quiz are implemented.

Questions have the following properties:
i. Quiz identifier, associating the question with a given quiz.
ii. Question number, used in random question selection.
iii. Multiple-choice format. Up to four possible answers, numbered alphabetically A to D, from which the user must select the correct answer. A possible enhancement would be to specify the number of possible answers in the quiz metadata.
iv. Correct answer, A to D.
v. Level—the level at which this question is used. This must be less than or equal to the number of levels specified for the quiz in the quiz metadata. This allows for gradation of difficulty at different levels.
vi. Subject. May optionally be used to specify the subject of the question, enabling the user to select questions by subject.

When the SMS Server receives the message from the User, it sets up a current session for that user, including the following information:
i. Quiz identifier, associating the session with a given quiz.
ii. Phone number of the user. This is used to maintain state between separate invocations of a session, and is received automatically with the SMS message.
iii. Session start date and time. This is used to determine whether a session has timed out.
iv. Session last update date and time: the last time an interaction with the user occurred in this session. This is used to determine whether a session has timed out.
v. Current level. This determines which level of question should next be asked. If the level is higher than the given number of levels for the quiz, then the user has successfully completed the quiz.
vi. Expected answer. This is the correct answer expected when the user next replies. If the user gives a different answer, then the quiz session is terminated and archived with status 'lost'.

Archived sessions include:
i. Quiz identifier, associating the archived session with a given quiz.
ii. Phone number of the user.
iii. Session start. Date/time the session was originally initiated. This is used in combination with quiz identifier and phone number to provide unique identification of archived sessions, thereby allowing a given user to enter the same quiz more than once.
iv. Final session status—won (prize not yet claimed), won (prize claimed), lost or timed out.

The detailed database schema is as follows:

Table: quiz_info

| | |
|---|---|
| quiz_id varchar2(10) | unique quiz identifier |
| description varchar2(1024) | description of quiz |
| max_level number(2, 0) | number of levels in the quiz |
| questions_per_level number (6, 0) | number of questions per level |
| max_delay number(8, 0) | timeout period in seconds |
| first_answer char(1) | first expected answer |
| aux_phone_number varchar2 (15) | 'Bartender' phone number |

Table: questions

| | |
|---|---|
| quiz_id varchar2(10) | quiz identifier (as above) |
| question_number number (8, 0) | question number within level |
| question_level number(2, 0) | level at which this question may be asked |
| subject varchar2(20) | subject (currently unused) |
| question varchar2(120) | the text of the question |
| answer_a varchar2(20) | possible answer A |
| answer_b varchar2(20) | possible answer B |
| answer_c varchar2(20) | possible answer C |
| answer_d varchar2(20) | possible answer D |
| correct_answer char(1) | correct answer, one of A, B, C or D |

Table: old_trivia_sessions

| | |
|---|---|
| quiz_id varchar2(10) | quiz identifier |
| phone_number number(15, 0) | user phone number |
| session_start char(20) date/time | text representation of session start |
| final_status char(1) | A = abandoned, L = lost, W = winner (not yet collected prize), P = winner (prize collected) |

Table: trivia_sessions

| | |
|---|---|
| quiz_id varchar2(10) | quiz identifier |
| phone_number number(15, 0) | user phone number |
| session_start char(20) date/time | text representation of session start |
| session_updated number (15, 0) | date/time of last interaction in seconds |
| current_level number(2, 0) | current level |
| expected_answer char(1) | correct answer to last question sent to user |

The above detailed implementation does not support selection from a set of possible prizes. To support this feature, the details of the prizes are stored in a new table connected to the quiz_info table by the quiz ID.

Circumstances can be envisaged in which the quiz might be played in many places simultaneously—for example, all the pubs in a given chain. In this case, it is necessary to cope with multiple 'bartender' phone numbers rather than the single one in the above example. In that case, it is necessary to store the bartender phone numbers along with a location code, in a separate table connected to the quiz_info table by the quiz ID.

To determine the correct 'bartender' phone number for the location of the user, any one of a number of techniques may be used. For example, the user inputs their location at the same time as their prize selection details. Alternatively, the location is determined automatically from the phone number to which the user sends their SMS messages—this requires one number per location. Alternatively, the phone number is determined automatically from the name of the quiz input by the user (e.g. trivia99 instead of trivia for location 99).

The system may also include an administration interface, preferably accessible via the World Wide Web, for tasks such as:
i. Set up a new quiz with all its parameters.
ii. Alter parameters of an existing quiz.
iii. Add quiz questions (for example via XML-format data file).

iv. Enable/disable quizzes.

v. Report on quiz statistics.

Various alternative applications of the system may be envisaged which nevertheless fall within the scope of the invention. For example, the information necessary to begin the game may be displayed by other means, such as printed on tickets, disposable bags or product packaging, or displayed on a video display. The system may be implemented at fast food or retail outlets, or in any circumstance where the user participating in the quiz is close to the source of the prize.

SMS and paging protocols are an advantageous means of disseminating the necessary messages, but other protocols may be used to similar effect. For example, the interaction between the user and the quiz host web server may use web or WAP protocols, with the User's Mobile Phone being replaced by a web or WAP-enabled device. Advantageously, the user uses a wireless portable device so as to be able freely to travel to the location and take part in the game without the need for special communications equipment at the location. The message sent at step 12b may be sent to a fixed terminal at the location where the prize is issued, since this location does not normally need to be changed. For example, the message may be sent as an e-mail which can be read at a terminal at the location.

The verification of the voucher number at step 14b does not need to be done manually in circumstances where the user's wireless terminal and the location-based terminal are able to communicate directly with one another, for example over a wireless LAN using Bluetooth™ protocols. In that case, the user need not enter a name at step 11; instead, the user's wireless terminal may transmit a device identifying code to the SMS Server and the location-based terminal later verifies this code using wireless LAN protocols. A verification code transmitted by the SMS Server is not necessary, but may be used for additional verification.

The prize may be issued automatically by a vending machine incorporating or connected to the location-based terminal. In that case, the user enters the voucher number on a keypad of the vending machine and a prize is issued if the number matches that received by the location-based terminal. Alternatively, the voucher number may be transmitted as a signal from the user's terminal to the vending machine, using for example wireless LAN protocols.

Various other embodiments may be envisaged, which nevertheless fall within the spirit and scope of the present invention.

What is claimed is:

1. A method of implementing a question session at a communications server in a first location comprising:
   a. receiving, at the first location, an answer message from a wireless communications device;
   b. comparing the answer message to a stored answer, and, if the answer message matches the stored answer, transmitting a verification code to a predetermined communications device different from said wireless communications device, the predetermined communications device and the wireless communications device being at a second location to facilitate awarding of a prize associated with the transmitted verification code; said verification code transmitted to said predetermined communications device being verifiable against a verification code stored at the wireless communications device.

2. A method according to claim 1, including, prior to step a, transmitting a stored question message to said wireless communications device.

3. A method according to claim 2, including, prior to said step of transmitting said stored question message, receiving a previous answer message from the wireless communications device, and comparing said previous answer message to a stored previous answer; wherein said stored question message is transmitted if said previous answer message matches said stored previous answer.

4. A method according to claim 1, wherein said verification code is transmitted to said wireless communications device.

5. A method according to claim 4, further including receiving a user identifying code from the wireless communication device, wherein said user identifying code is transmitted to the predetermined communication device if the answer message matches the stored answer.

6. A method according to claim 1, wherein said verification code is received from said wireless communications device.

7. A method according to claim 1, including verifying said verification code stored at the wireless communications device against said verification code transmitted to said predetermined communications device.

8. A method according to claim 7, including issuing the prize at the second location if said verifying step is successful.

9. A method of verifying at a communications terminal an outcome of a question session at a wireless terminal, including:
   a. receiving, from a server in a first location, a win indication message including a verification code at said communications terminal; and
   b. verifying, in a second location, said verification code against a verification code stored at said wireless terminal, the wireless terminal and the communications terminal being in the second location to facilitate awarding of a prize associated with the verification codes.

10. A method according to claim 9, including issuing the prize at the second location if said verification step is successful.

11. A method according to claim 9, including displaying a network address accessible to said wireless terminal and proximate said communications terminal, said network address enabling said wireless terminal to initiate said question session.

12. A method according to claim 9, wherein said win indication message includes a user identifying code, and further including the step of broadcasting said user identifying code.

13. A method of participating in a question session, including:
   a. entering an answer message at a wireless communications terminal;
   b. transmitting said answer message to a predetermined address;
   c. receiving a win indication at the wireless communications terminal from a server;
   d. storing a verification code at the wireless terminal; and
   e. verifying said verification code against a verification code received by a further communications terminal separate from said wireless terminal, the server being at a first location and the communications terminal and the wireless terminal being at a second location to facilitate awarding of a prize associated with the verification codes.

14. A method according to claim 13, including receiving the prize at the second location if said verifying step is successful.

15. A method according to claim 13, wherein said predetermined address is displayed proximate said further communications terminal.

16. A method according to claim 13, including transmitting a user identifying code from the wireless terminal to said predetermined address.

17. In a communications system comprising a first, wireless, terminal and a second terminal, the first terminal being able to transmit messages to and receive messages from a communications server, and the second terminal being able to receive messages from said communications server, a method comprising the steps of:

a. storing an answer record and an address of the second terminal at the server;

b. entering an answer message at the first terminal;

c. transmitting said answer message from the first terminal to the server;

d. comparing, at the server, said answer message with said answer record, and, if said answer message matches said answer record:

i. transmitting a first notification message to the first terminal, the first terminal, the first notification message including a verification code;

ii. transmitting a second notification message to the second terminal, the second notification message including said verification code; the verification code received by the first terminal being verifiable against the verification code received by the second terminal, the server being at a first location and the first and second terminals being at a second location to facilitate awarding of a prize associated with the verification codes.

18. A method according to claim 17, further including the step of transmitting a user identifying code from the first terminal to the server, wherein the second notification message includes said user identifying code.

19. A method according to claim 17, wherein the communications server stores at least one question record, the method including, prior to step b, transmitting a question message, derived from the question record, from the communications server to the first terminal.

20. A method according to claim 19, further including the step of receiving a previous answer message at the communications server from the first terminal, wherein the communications server stores a further answer record, compares the previous answer message with the further answer record, and transmits said question message only if the previous answer message matches the further answer record.

21. A method according to claim 17, further including the step of verifying the verification code received by the first terminal against the verification code received by the second terminal.

22. A method according to claim 21, further including the step of issuing the prize at the second location if said step of verifying is successful.

23. A method according to claim 21, further including the step of displaying an address of the communications server proximate the second terminal.

24. An apparatus comprising means to perform the method according to claim 1.

25. A computer-readable medium encoded with a computer program for performing a method according to claims 1 or claim 17.

26. An apparatus to perform the method of claim 9.

27. An apparatus to perform the method of claim 13.

28. An apparatus to perform the method of claim 17.

* * * * *